D. E. HAYWARD.

Improvement in Heel-Stiffners.

No. 5,089. Reissued Oct. 8, 1872.

*Witnesses.*

Sam Cooper

P. C. Peschemacher

*Inventor.*

D. E. Hayward.

AM. PHOTO-LITHOGRAPHIC CO. N.Y. (OSBORNE'S PROCESS.)

UNITED STATES PATENT OFFICE.

DANIEL E. HAYWARD, OF MELROSE, ASSIGNOR, BY MESNE ASSIGNMENTS, TO WILLIAM F. SPINNEY, OF CHELSEA, AND CHARLES W. MELCHER, OF LYNN, MASSACHUSETTS.

IMPROVEMENT IN HEEL-STIFFENERS.

Specification forming part of Letters Patent No. 40,409, dated October 27, 1863; reissues Nos. 2,770 and 2,771, dated October 8, 1867; reissue No. 5,089, dated October 8, 1872.

*To all whom it may concern:*

Be it known that DANIEL EDWIN HAYWARD, of Melrose, in the county of Middlesex and State of Massachusetts, has invented an Improved Heel-Stiffener or Counter for Boots and Shoes, of which the following is a full, clear, and exact description, reference being had to the accompanying drawing making part of this specification, in which—

Figure 1:
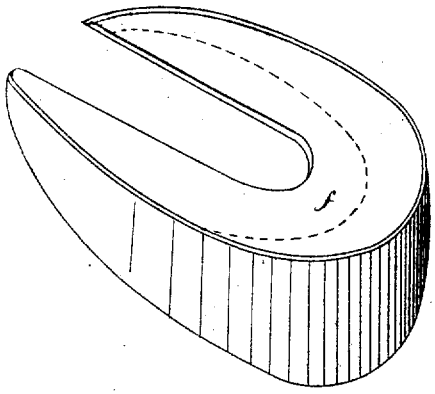
Figure 2:
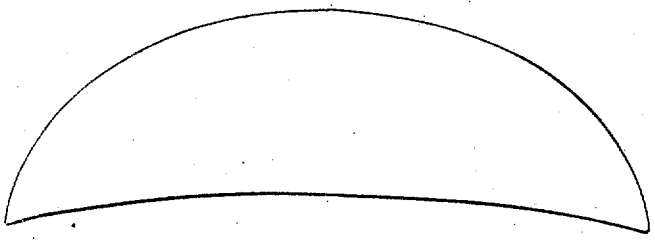

Figure 1 is a view of the improved heel-stiffener, and Fig. 2 is a view of the piece of sheet rubber of which it is made.

Heel-stiffeners or counters have heretofore been made of leather, but the labor required to cut them out and skive them is considerable. The chief objection, however, to which they are liable, arises from the time and labor required to apply them to the boot or shoe. After being cut out and skived they are temporarily secured to the last and lining, and then bent round and crimped or formed over upon the insole and secured there. This must be done when the stiffener or counter is damp and pliable. The leather stiffener is also liable to the objection that it will lose its resiliency if bent out of shape when wet, and will not return to its original form, and then the boot or shoe wears to one side. The cheaper substitutes for leather which have been employed for stiffeners, such as pasteboard and factitious leather, when made by hand, as above described, are of little value as compared with a stiffener which can be molded and shaped to its desired form at one operation, as by the invention hereinafter described.

We are aware that heel-stiffeners have been made of sheet-rubber which has been cut, folded, crimped, and cemented over the sole while in the course of construction. This is expensive, and we lay no claim to any such stiffener.

In the manufacture of the improved stiffener we employ any suitable compound of India rubber, which, when vulcanized, will have the required stiffness combined with the necessary resiliency. The compound, after being ground upon the ordinary heated rolls, is spread in a sheet of from one-eighth to one-tenth of an inch in thickness upon cotton or other cloth, the thickness of the sheet and of the cloth varying with the size of the required stiffener. Pieces, Fig. 2, are then cut from the sheet of cloth and rubber of the required size, which are placed in a mold and vulcanized, the cloth being thrown upon the inside of the stiffener and the mold being of the form that shall give it the required shape, Fig. 1, the part *f* which goes beneath the heel being of the exact form ultimately required, so that when applied to the boot or shoe it is simply necessary to put it in place, no wetting, crimping, bending, or temporary nailing being required. When the upper leather and sole are applied the stitches, nails, or pegs that hold them together also pass through the part *f* of the stiffener in the ordinary manner.

This stiffener is also permanently resilient, even when wet, and does not lose its form or shape, however long or severe the wear to which it is exposed. This stiffener may be placed outside the leather, if preferred.

The proportions which we prefer for the compound to be employed in the manufacture of the improved counter are as follows: Eight pounds crude rubber; two pounds litharge; one pound white lead; one pound lamp-black; four pounds calcined plaster; six ounces flowers sulphur.

This compound, after being thoroughly ground upon the ordinary heated rolls and placed in the molds is vulcanized by exposure for ten hours or thereabout to a temperature of 275° Fahrenheit. We do not, however, wish to confine ourselves to any particular compound or to any particular length of time or degree of heat for vulcanizing the same.

What we claim as the invention of the said HAYWARD, and desire to secure by Letters Patent, is—

1. As a new article of manufacture, a heel-stiffener or counter which is shaped by the mold in which it is formed, substantially as described.

2. Also, the art or process of making heel-stiffeners by molding them to shape in a mold, substantially as set forth.

WILLIAM F. SPINNEY.
CHAS. W. MELCHER.

Witnesses:
R. E. HARMON,
SAML. A. JOHNSON.